(12) United States Patent
Ackaret et al.

(10) Patent No.: US 8,635,488 B2
(45) Date of Patent: Jan. 21, 2014

(54) IMPLEMENTING ULTRA HIGH AVAILABILITY PERSONALITY CARD

(75) Inventors: Jerry D. Ackaret, Beaverton, OR (US); Justin P. Bandholz, Cary, NC (US); Brian E. Bigelow, Apex, NC (US); Joseph E. Bolan, Cary, NC (US); Kevin M. Cash, Cary, NC (US); David L. Cowell, Garner, NC (US); Martin J. Crippen, Apex, NC (US); Christopher L. Durham, Research Triangle Park, NC (US); Jeffery M. Franke, Apex, NC (US); James E. Hughes, Apex, NC (US); David J. Jensen, Raleigh, NC (US); John K. Langgood, Cary, NC (US); Bay Van Nguyen, Durham, NC (US); James A. O'Connor, Ulster Park, NY (US); Derek Robertson, Durham, NC (US); John M. Sheplock, Raleigh, NC (US); Wilson E. Smith, Bahama, NC (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 13/291,874

(22) Filed: Nov. 8, 2011

(65) Prior Publication Data

US 2013/0117601 A1    May 9, 2013

(51) Int. Cl.
*G06F 11/00* (2006.01)

(52) U.S. Cl.
USPC ............................................. 714/2; 714/1

(58) Field of Classification Search
USPC .................................... 714/1, 2, 27, 47.1, 48
See application file for complete search history.

(56) References Cited

U.S. PATENT DOCUMENTS

| | | | | |
|---|---|---|---|---|
| 7,757,123 | B1 * | 7/2010 | Gasser et al. | 714/27 |
| 2005/0097255 | A1 * | 5/2005 | Barenys et al. | 710/316 |
| 2007/0174517 | A1 * | 7/2007 | Robillard et al. | 710/62 |
| 2013/0067134 | A1 * | 3/2013 | Austen et al. | 710/305 |

* cited by examiner

*Primary Examiner* — Yolanda L Wilson
(74) *Attorney, Agent, or Firm* — Joan Pennington

(57) ABSTRACT

A method and circuit for implementing an enhanced availability personality card for a chassis computer system, and a design structure on which the subject circuit resides are provided. The personality card includes a first erasable programmable read only memory (EPROM) and a second EPROM, each EPROM storing Vital Product Data (VPD) and a first temperature sensor and a second temperature sensor sensing temperature. A primary bidirectional bus and a redundant bidirectional bus are respectively connected between the first EPROM and the first temperature sensor and the second EPROM and the second temperature sensor, and a pair of chassis management modules. Each chassis management module includes a switch connected to both the primary bidirectional bus and the redundant bidirectional bus providing redundant paths, enabling continued function with failure of any critical personality card component.

20 Claims, 7 Drawing Sheets

IMPLEMENTING ULTRA HIGH AVAILABILITY PERSONALITY CARD

FIELD OF THE INVENTION

The present invention relates generally to the data processing field, and more particularly, relates to a method and circuit for implementing an enhanced availability personality card for a chassis computer system, and a design structure on which the subject circuit resides.

DESCRIPTION OF THE RELATED ART

A chassis computer system including multiple blade computers coupled together in a common center, is known as a blade center or blade chassis. Each blade is a pluggable board including at least one processor, on-board memory, and an Input/Output (I/O) interface. The multiple blades are capable of communicating with one another, as well as sharing common resources, such as storage devices, monitors, and input devices.

Designing the best computer systems is a complex engineering challenge that requires working to achieve optimum balance between all the key considerations important to the customer. Considerations include performance, reliability, availability, security, total cost-of-ownership, ease of service, and the like.

When building a chassis computer system it is an important to provide reliability, preventing system crashes, and to provide high availability designing the blade chassis so that the blade chassis has sufficient redundancy to survive a failure so that it is repairable without having to take down the chassis, minimizing unscheduled outages and scheduled outages. Most chassis subassemblies such as BladeServers, power supplies and blowers or fans are designed with sufficient redundancy so that they can survive a failure and be concurrently repaired.

Nevertheless, on occasion, due to special requirements or packaging constraints there may exist a subassembly, such as a chassis personality card, that would pose other problems if easily accessible and hot swappable. A need exists for an effective method and circuit to implement an enhanced availability personality card for a chassis computer system, while providing effective system reliability.

SUMMARY OF THE INVENTION

Principal aspects of the present invention are to provide a method and circuit for implementing an enhanced availability personality card for a chassis computer system, and a design structure on which the subject circuit resides. Other important aspects of the present invention are to provide such method, circuitry, and design structure substantially without negative effect and to overcome many of the disadvantages of prior art arrangements.

In brief, a method and circuit for implementing an enhanced availability personality card for a chassis computer system, and a design structure on which the subject circuit resides are provided. The personality card includes a first erasable programmable read only memory (EPROM) and a second EPROM, each EPROM storing Vital Product Data (VPD) and a first temperature sensor and a second temperature sensor sensing temperature. A primary bidirectional bus and a redundant bidirectional bus are respectively connected between the first EPROM and the first temperature sensor and the second EPROM and the second temperature sensor and a pair of chassis management modules. Each chassis management module includes a switch connected to both the primary bidirectional bus and the redundant bidirectional bus providing redundant paths, enabling continued function with failure of any critical personality card component.

In accordance with features of the invention, the primary bidirectional bus and the redundant bidirectional bus comprising a respective independent I2C bus are coupled by a midplane of the chassis computer system to the pair of chassis management modules.

In accordance with features of the invention, the method and circuit substantially eliminates unscheduled system crashes or unscheduled outages, with design enhancements and through the use of redundancy for any critical components that would be considered Single Points of Failure (SPOFs). The method and circuit effectively and efficiently substantially eliminates scheduled outages also. A personality card alert is created, calling for scheduled repair, only responsive to an access failure of both redundant components on the card. Given the high reliability of most electronic components the probability of having both redundant components fail on the card in the useful life time of the card will be extremely rare, thus the operation is continued using the still functional redundant component and even a scheduled repair is unnecessary. Only in the rare case where both components fail will a scheduled replacement of the personality card be necessary. In the rare case where both EPROMs fail, data last read from the personality card and preserved in another part of the system is utilized to enable the system to continue to operate.

In accordance with features of the invention, responsive to a failure to successfully read data either the first EPROM or the second EPROM or a failure to read temperature from the first temperature sensor or the second temperature sensor, the chassis management module creates a personality card alert calling for repair. The respective chassis management module continues to operate using data last read from the personality card. The respective chassis management module selectively schedules taking the chassis down to replace the personality card only in the rare case where both critical components fail.

In accordance with features of the invention, a respective chassis management module performs runtime read of the data from either the first EPROM or the second EPROM and performs runtime read of temperature from the first temperature sensor or the second temperature sensor of the personality card. A respective chassis management module performs runtime write of data to the first EPROM and the second EPROM.

In accordance with features of the invention, a respective chassis management module generates a personality card alert only when the respective chassis management module can not access the first EPROM or the second EPROM. The respective chassis management module generates a personality card alert only when the respective chassis management module can not access the first temperature sensor or the second temperature sensor of the personality card.

In accordance with features of the invention, the personality card includes a first general purpose I/O (GPIO) and a second GPIO respectively connected to the primary bidirectional bus and the redundant bidirectional bus. The respective chassis management module performs runtime operation to turn on a chassis LED via the first GPIO and the second GPIO.

In accordance with features of the invention, the personality card is located with the midplane of the chassis computer system. Single-Points-of-Failure (SPOF) are eliminated from the personality card and although the personality card remains a Single-Point-of-Repair (SPOR), repairs are so infrequent very high availability of the personality card is ensured.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a circuit and method for implementing an enhanced availability personality card for a chassis computer system, and a design structure on which the subject circuit resides are provided.

Figure 1A:
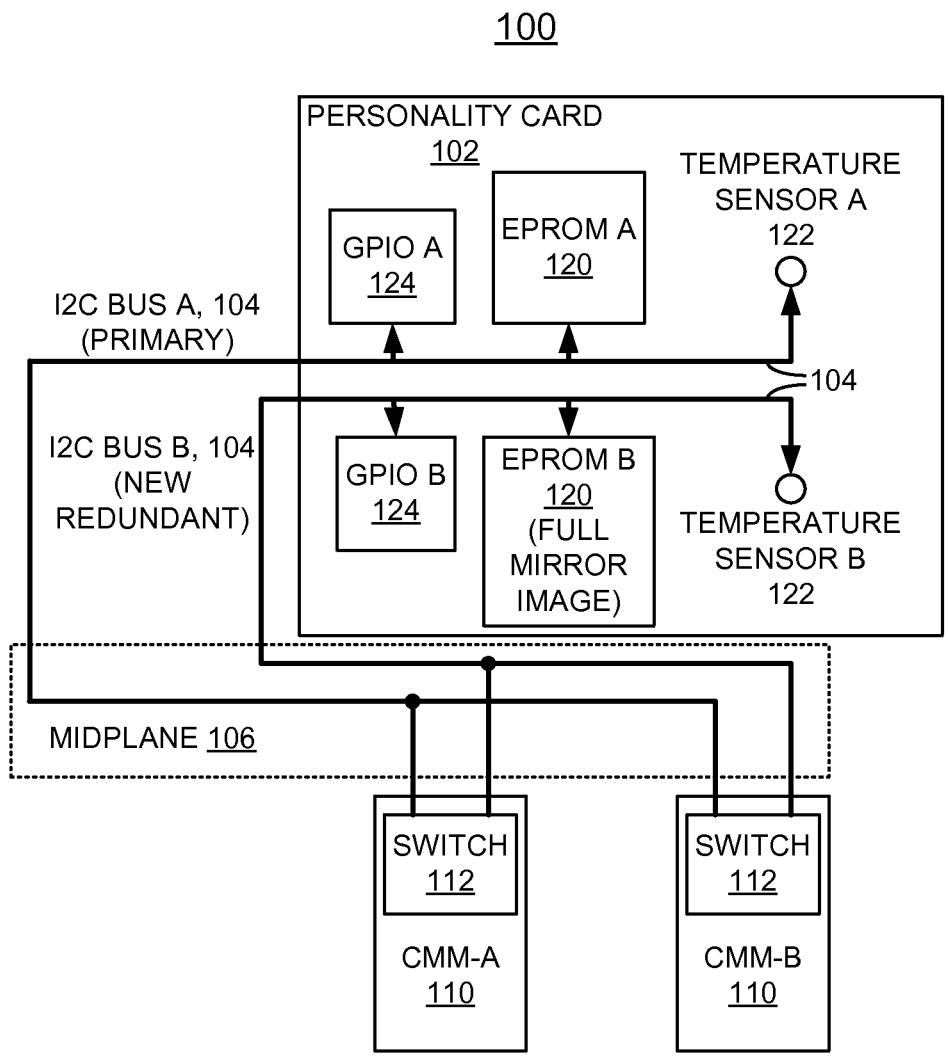
FIGS. 1A and 1B are respective schematic and block diagram illustrating an exemplary circuit implementing an enhanced availability personality card in a chassis computer system in accordance with the preferred embodiments.
Figure 1B:
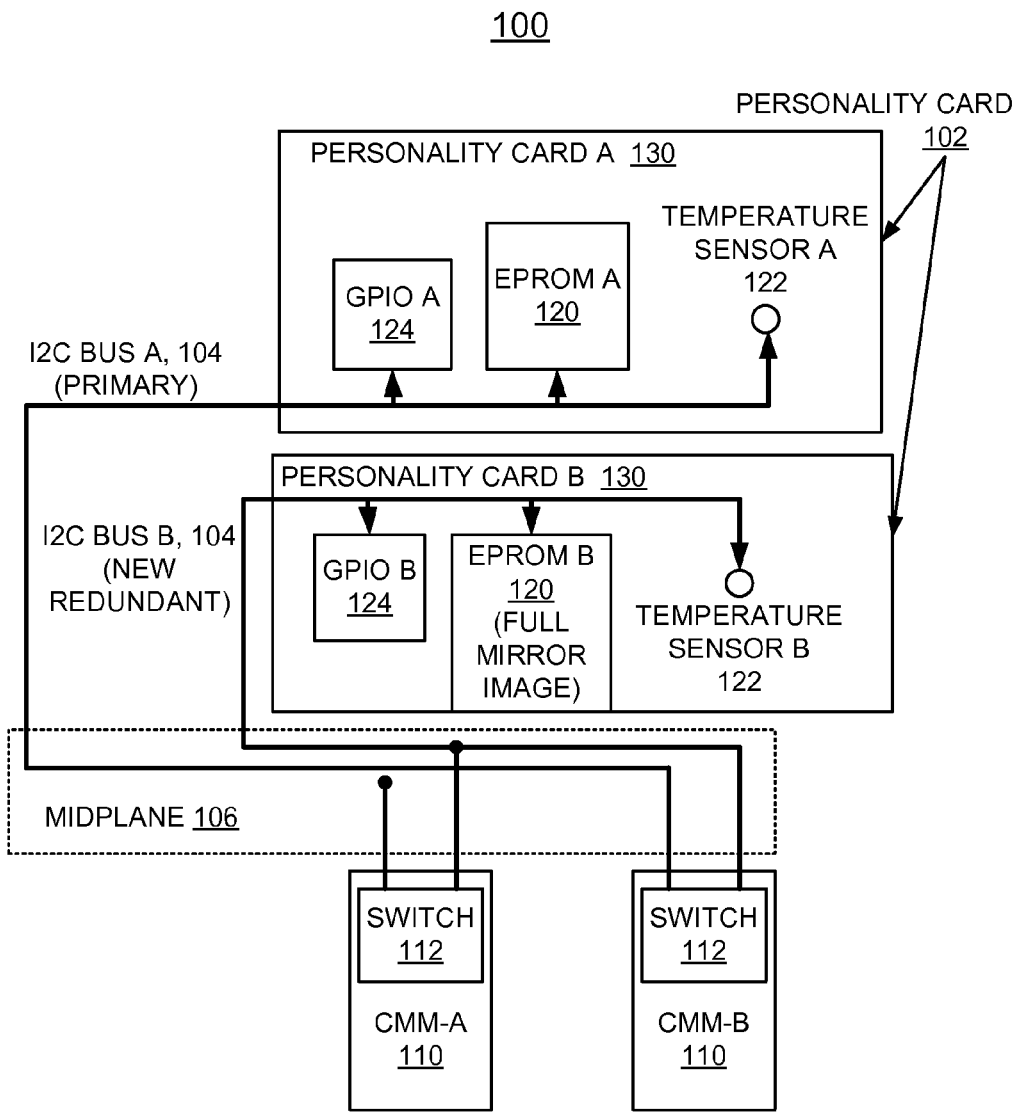

Having reference now to the drawings, in FIGS. 1A and 1B, there is shown an example circuit generally designated by the reference character 100 for implementing an enhanced availability personality card for a chassis computer system in accordance with the preferred embodiments. The personality card circuit 100 supports chassis computer system including between multiple servers, and includes redundant components and paths enabling continued function with failure of any component.

The personality card circuit 100 includes a personality card 102 connected by a first I2C bus A, 104 or primary I2C bus A, 104, and a second I2C bus B, 104 or redundant I2C bus B, 104 via a midplane 106 of an associated chassis computer system to a pair of chassis management modules (CMM) A, B, 110.

Each of the chassis management modules (CMM) A, B, 110 includes a respective switch 112 connected to both the primary I2C bus A, 104 and the redundant I2C bus B, 104.

Figure 4:
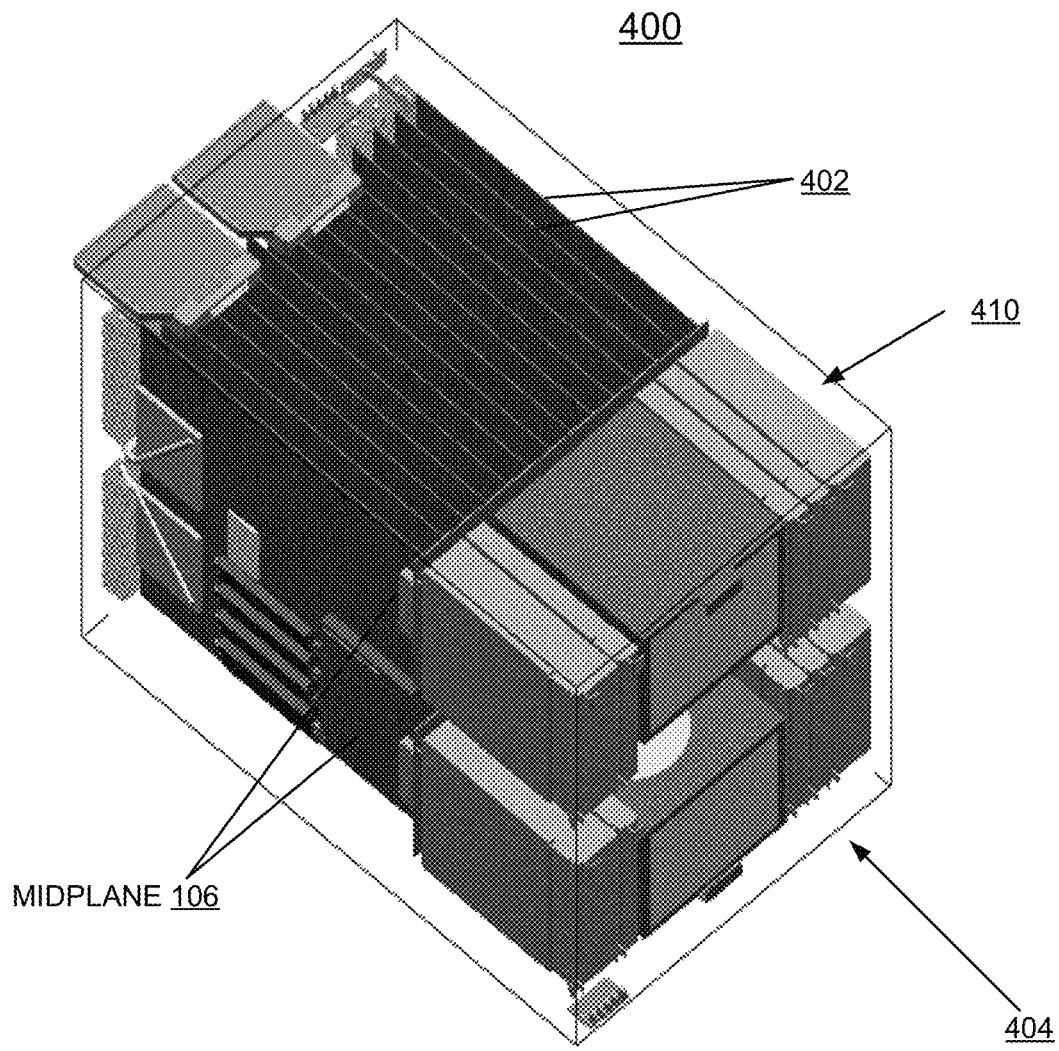
FIGS. 4 and 5 illustrate a respective example chassis computer system for implementing an enhanced availability personality card in of the circuit of FIG. 1 in accordance with the preferred embodiment.
Figure 5:
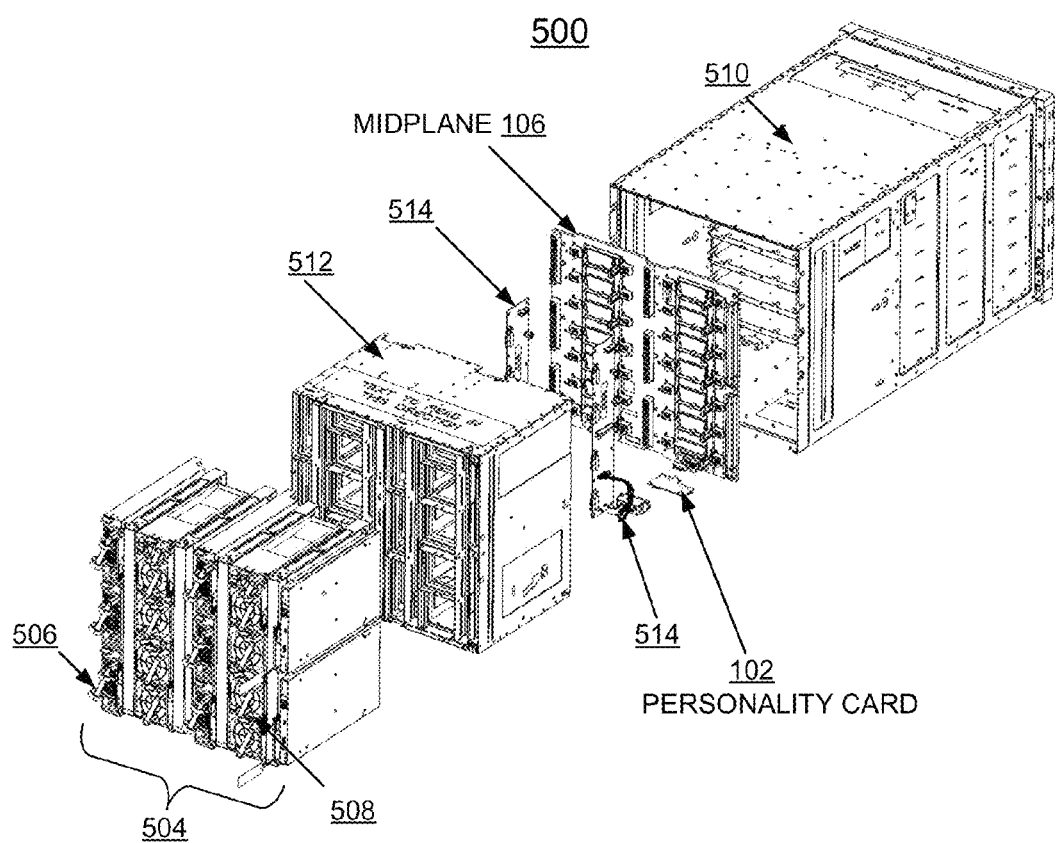

In accordance with features of the invention, for example, as illustrated and described with respect to FIGS. 4 and 5, the personality card circuit 100 is located with the midplane 106 of a chassis computer system 400 and a chassis computer system 500. Single-Points-of-Failure (SPOF) are eliminated from the personality card 102 and although the personality card 102 remains a Single-Point-of-Repair (SPOR) repairs are so infrequent ensuring very high availability of the personality card.

In accordance with features of the invention, the personality card 102 and circuit 100 includes component redundancy and redundant paths so that any single component can fail and the personality card 102 continues to run unimpaired. Furthermore, if a circuit component fails, no visible alert is generated. Instead the circuit 100 and personality card 102 simply continue to function using the redundant paths to redundant components.

In accordance with features of the invention, the personality card 102 of circuit 100 includes a novel fail-in-place design. When the personality card 102 fails, operation of the chassis computer system is continued using previously read data from the personality card 102. The chassis computer system is scheduled to be taken down for a scheduled replacement of the personality card 102 only when both the first and second redundant critical components fail.

The personality card 102 includes a pair of erasable programmable read only memories (EPROMs) A, B, 120 storing Vital Product Data (VPD) for the chassis computer system. Vital Product Data (VPD) is a collection of configuration and informational data associated with a particular set of hardware or software. Vital product data (VPD) stores information such as software version, details of the hardware configuration, levels of the hardware, part numbers, serial numbers, firmware and software component levels, and details of the server system configuration.

Each of the EPROMs A, B, 120 is a type of non-volatile memory chip retaining its data when its power supply is turned off, and the data stored in the EPROM is erased with ultraviolet light. For example, EPROM A, 120 is a primary device and the EPROM B, 120 provides a full mirror image of data stored on EPROM A, 120.

The personality card 102 includes a first temperature sensor A, 122, and a second redundant temperature sensor B, 122. The personality card 102 includes a first general purpose I/O (GPIO) A, 124, and a second GPIO B, 124. Each of the components EPROMs A, B, 120, temperature sensors A, B, 122, and GPIOs A, B, 124 of the personality card 102 is connected to the respective independent I2C bus A, B, 104. The redundant components and redundant paths provided by the respective independent I2C bus A, B, 104 eliminate the need for a multiplexer used with conventional personality card arrangements.

In accordance with features of the invention, the personality card circuit 100 includes redundant components and paths enabling continued function with failure of any component. The personality card circuit 100 eliminates critical SPOF (Single-Points-of-Failure) and although a SPOR (Single-Point-of-Repair) remains the need for a repair is virtually eliminated because the probability of both the first and second redundant component failing is so low over the useful life of the product to be virtually nonexistent providing very high availability.

Each I2C bus A, B, 104 comprises an independent bidirectional bus or link providing multiple possible routing paths to each of the components EPROMs A, B, 120; temperature sensors A, B, 122; and GPIOs A, B, 124 via the respective CMM switch 112 connected both the primary I2C bus A, 104 and the redundant I2C bus B, 104 of the respective CMM A, B, 110.

As shown in FIG. 1B, the personality card 102 of the circuit 100 optionally includes a first personality card A, 130, and a second personality card B, 130. The first personality card A, 130 includes the first EPROM and the first temperature sensor and second personality card B, 130 includes the second EPROM and the second temperature sensor, eliminating Single-Points-of-Failure (SPOF) and ensuring very high availability of the personality card.

Figure 2:
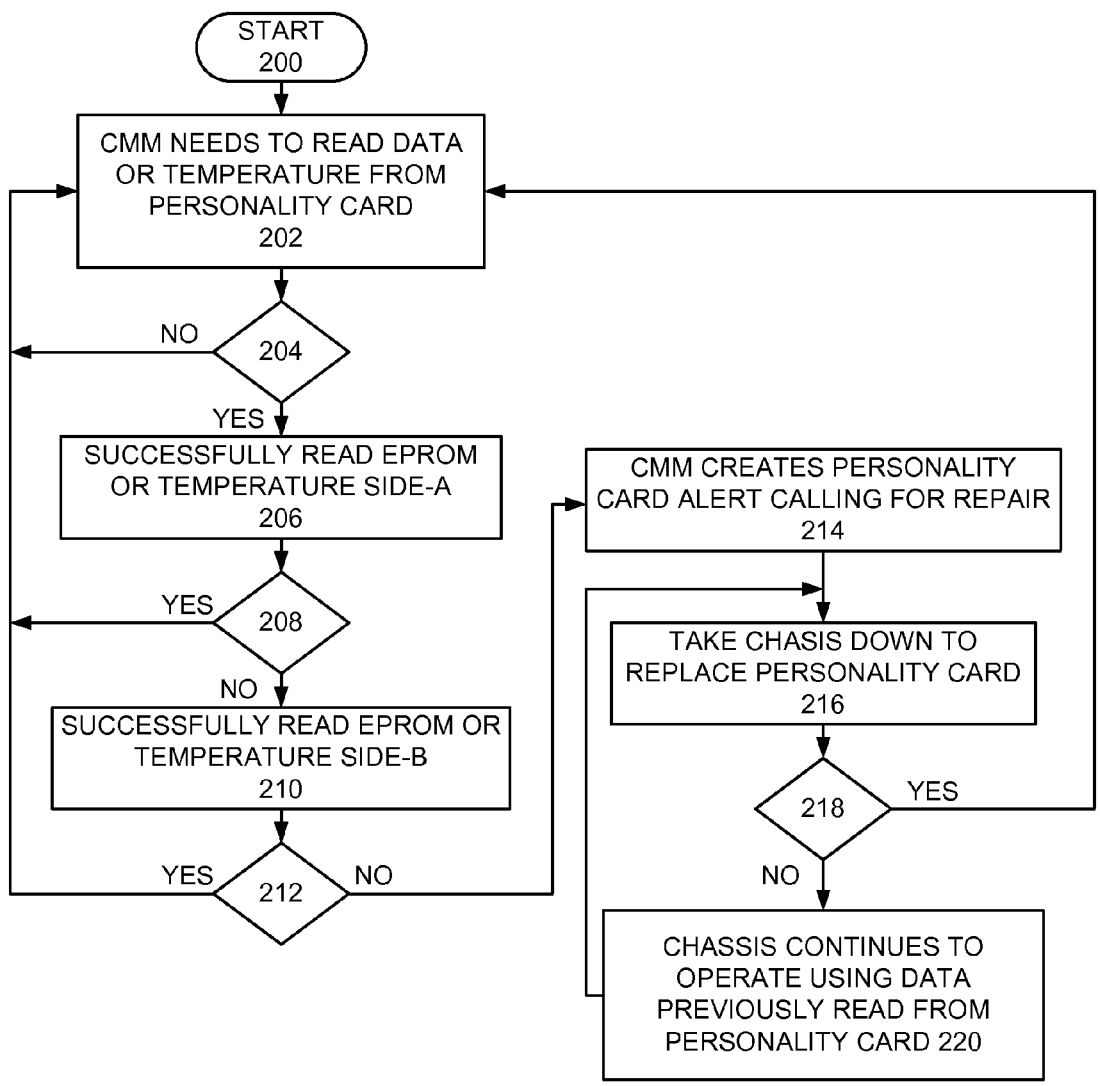
FIG. 2 is a flow chart illustrating exemplary read operations performed by a chassis management module of the personality card of the circuit of FIG. 1 in accordance with the preferred embodiment.

Referring to FIG. 2 there are shown exemplary read operations performed by a chassis management module 110 of the personality card 102 of the circuit 100 in accordance with the preferred embodiment starting at a block 200. As indicated at a block 202, it is determined if the CMM needs to read data or temperature from the personality card. If the CMM does not need to read data or temperature from the personality card as indicated at a decision block 204, then the operations return to block 202. Otherwise when determined the CMM needs to read data or temperature from the personality card at decision block 204, then checking for successful read of EPROM A, 120 or temperature sensor A, 122 is performed as indicated at a block 206. If not a successful read of EPROM A, 120 or temperature sensor A, 122 as indicated at a decision block 208, then checking for a successful read of EPROM B, 120 or temperature sensor B, 122 is performed as indicated at a block 210. When a successful read of EPROM A, 120 or temperature sensor A, 122 is identified at decision block 208, then the operations return to block 202.

If not a successful read of EPROM B, 120 or temperature sensor B, 122 as indicated at a decision block 212, then the CMM creates a personality card alert calling for a repair as indicated at a block 214. As indicated at a block 216, it is determined if the chassis is to be taken down to replace the personality card 102. When determined that the chassis is not to be taken down to replace the personality card 102 as indicated at a decision block 218, then the chassis continues to operate using data previously read from the personality card as indicated at a block 220. When determined that the chassis is scheduled to be taken down to replace the personality card 102 at decision block 218, then the operations return to block 202.

Figure 3:
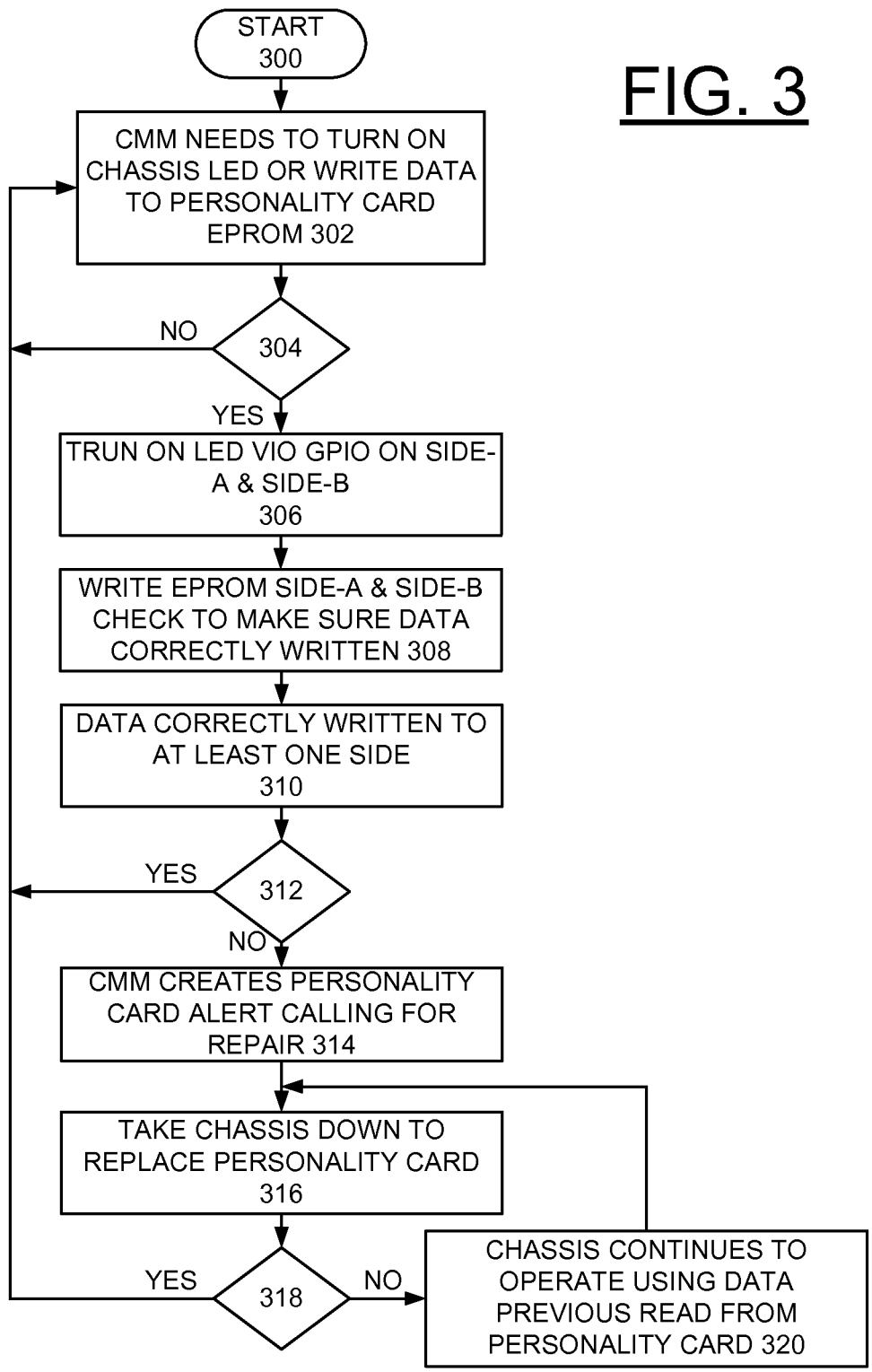
FIG. 3 is a flow chart illustrating exemplary write operations performed by a chassis management module of the personality card of the circuit of FIG. 1 in accordance with the preferred embodiment.

Referring to FIG. 3 there are shown exemplary write operations performed by a chassis management module of the personality card 102 of the circuit 100 in accordance with the preferred embodiment starting at a block 300. As indicated at a block 302, it is determined if the CMM needs to turn on a chassis LED or write data to the personality card. If the CMM does not need to turn on a chassis LED or write data to the personality card as indicated at a decision block 304, then the operations return to block 302. If the CMM needs to turn on chassis LED, then the LED is turned on via the GPIO A, 124 or the GPIO B, 124 as indicated at a block 306. If the CMM needs to write data to the personality card, then each of the EPROM A, 120 and EPROM B, 120 is written to make sure data is correctly written as indicated at a block 308.

It is determined if the data is correctly written to at least one of EPROM A, 120 and EPROM B, 120 as indicated at a block 310. If determined that the data is correctly written to at least one of EPROM A, 120 and EPROM B, 120 as indicated at a decision block 312, then the operations return to block 302. If determined that the data is not correctly written to at least one of EPROM A, 120 and EPROM B, 120, the CMM creates a personality card alert calling for repair as indicated at a block 314. Next it is determined if the chassis is to be taken down to replace the personality card 102 as indicated at a block 316. When determined that the chassis is not to be taken down to replace the personality card 102 as indicated at a decision block 318, then the chassis continues to operate using data previously read from the personality card as indicated at a block 320. When determined that the chassis is scheduled to be taken down to replace the personality card 102 at decision block 318, then the operations return to block 302.

Referring now to FIGS. 4 and 5, there are shown a respective example chassis computer system for implementing an enhanced availability personality card 102 in of the circuit 100 of FIG. 1 respectively generally designated by the reference character 400 and 500 in accordance with the preferred embodiment. Each respective chassis computer system 400 and chassis computer system 500 includes the midplane 106 and the personality card 102 of circuit 100 of FIG. 1.

As shown in FIG. 4, the chassis computer system 400 includes a plurality of multiple blade computers 402 that are coupled together by the midplane 106 and are capable of communicating with one another, as well as sharing common resources, such as storage devices, monitors, and input devices. Each of the multiple blades 402 is a pluggable board including at least one processor, on-board memory, and an Input/Output (I/O) interface. The computer system 400 includes a plurality of hot plug modules 404 and the multiple blade computers 402 received within a common center or chassis 410.

Referring also to FIG. 5, as shown the chassis computer system 500 includes a plurality of hot plug modules 504 including a plurality of power supplies 506 and a plurality of fan packs 508 received within a chassis 510. As shown, the chassis computer system 500 includes a shuttle 512 receiving the hot plug modules 504 and a pair of fan distribution cards 514.

In FIGS. 4 and 5, the respective personality card 102 of circuit 100 of the chassis computer system 400 and the chassis computer system 500 is located with the midplane 106 within the respective chassis 410, 510. The respective personality card 102, which holds VPD associated with the chassis computer system 400 and the chassis computer system 500 includes the innovative fail-in-place design implemented for providing ultra high availability in accordance with the preferred embodiment.

For example, as shown FIG. 5, the personality card 102 is a small pluggable card received within the midplane 106 of the chassis computer system 500. The personality card 102 is deliberately designed to not be hot swappable and is located within the respective chassis 410, 510 so that it can not be easily moved because doing so could make it impossible for management software to accurately and uniquely identify a particular chassis computer system 400 or a particular chassis computer system 500 in a multiple chassis system.

In accordance with features of the invention, the failure of the personality card 102 does not cause an unscheduled outage of the chassis computer system 400 or the chassis computer system 500. When a personality card 102 fails, each of the chassis computer system 400 and the chassis computer system 500 continues to operate using previously read data from the personality card 102. The chassis computer system 400 or the chassis computer system 500 is powered down for a scheduled replacement of the personality card 102.

Figure 6:
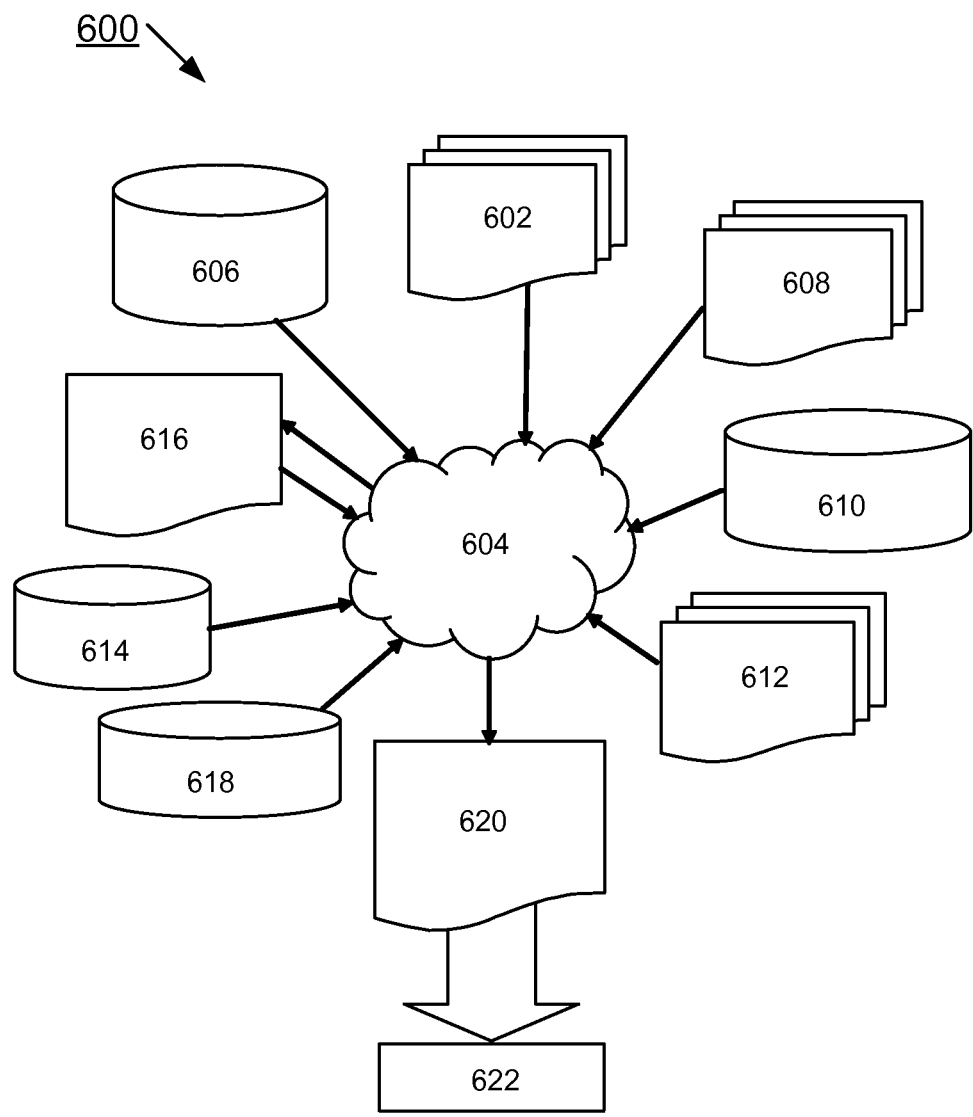
FIG. 6 is a flow diagram of a design process used in semiconductor design, manufacturing, and/or test.

FIG. 6 shows a block diagram of an example design flow 600 that may be used for circuit 100 described herein. Design flow 600 may vary depending on the type of circuit or IC being designed. For example, a design flow 600 for building an application specific IC (ASIC) may differ from a design flow 600 for designing a standard component. Design structure 602 is preferably an input to a design process 604 and may come from an IP provider, a core developer, or other design company or may be generated by the operator of the design flow, or from other sources. Design structure 602 comprises circuits 102, 200 in the form of schematics or HDL, a hardware-description language, for example, Verilog, VHDL, C, and the like. Design structure 602 may be contained on one or more non-transitory machine readable medium. For example, design structure 602 may be a text file or a graphical representation of circuit 100. Design process 604 preferably synthesizes, or translates, circuits 100, 102 into a netlist 606, where netlist 606 is, for example, a list of wires, transistors, logic gates, control circuits, I/O, models, etc. that describes the connections to other elements and circuits in an integrated circuit design and recorded on at least one of machine readable medium. This may be an iterative process in which netlist 606 is resynthesized one or more times depending on design specifications and parameters for the circuits.

Design process 604 may include using a variety of inputs; for example, inputs from library elements 608 which may house a set of commonly used elements, circuits, and devices, including models, layouts, and symbolic representations, for a given manufacturing technology, such as different technology nodes, 32 nm, 45 nm, 90 nm, and the like, design specifications 610, characterization data 612, verification data 614, design rules 616, and test data files 618, which may include test patterns and other testing information. Design process 604 may further include, for example, standard circuit design processes such as timing analysis, verification, design rule checking, place and route operations, and the like. One of ordinary skill in the art of integrated circuit design can appreciate the extent of possible electronic design automation tools and applications used in design process 604 without deviating from the scope and spirit of the invention. The design structure of the invention is not limited to any specific design flow.

Design process 604 preferably translates an embodiment of the invention as shown in FIGS. 1A, 1B, 2, 3, and 5 along with any additional integrated circuit design or data (if applicable), into a second design structure 620. Design structure 620 resides on a storage medium in a data format used for the exchange of layout data of integrated circuits, for example, information stored in a GDSII (GDS2), GL1, OASIS, or any other suitable format for storing such design structures. Design structure 620 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1A, 1B, 2, 3, and 5. Design structure 620 may then proceed to a stage 622 where, for example, design structure 620 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A method for implementing an enhanced availability personality card for a chassis computer system, said method comprising:
   providing a pair of chassis management modules; each said chassis management module including a switch;
   connecting said switch of each chassis management module to a primary bidirectional bus and a redundant bidirectional bus respectively connected to the personality card;
   providing the personality card comprising redundant critical components of a first erasable programmable read only memory (EPROM) and a second EPROM, each EPROM storing Vital Product Data (VPD) and a first temperature sensor and a second temperature sensor sensing temperature;
   connecting said primary bidirectional bus and said redundant bidirectional bus to said first EPROM and said first temperature sensor and said second EPROM and said second temperature sensor,
   said primary bidirectional bus and said redundant bidirectional bus providing redundant paths, and
   enabling continued personality card function with failure of any critical personality card component.

2. The method as recited in claim 1 wherein enabling continued personality card function with failure of any critical personality card component includes one said chassis management module performing runtime read of data from either said first EPROM or said second EPROM; and one said chassis management module performing runtime read of temperature from said first temperature sensor or said second temperature sensor of the personality card.

3. The method as recited in claim 1 wherein enabling continued personality card function with failure of any critical personality card component includes one said chassis management module performing runtime write of data to the first EPROM and the second EPROM.

4. The method as recited in claim 1 wherein providing the personality card includes providing a first card including said first EPROM and said first temperature sensor and providing a second card including said second EPROM and said second temperature sensor, for eliminating Single-Points-of-Failure (SPOF) and ensuring very high availability of the personality card.

5. The method as recited in claim 1 includes creating a personality card alert calling for repair responsive to an access failure to the personality card of both critical redundant components, and continuing operation using data previously read from the personality card.

6. The method as recited in claim 1 includes responsive to a failure to successfully read data from both said first EPROM and said second EPROM, or responsive to a failure to read temperature from both said first temperature sensor and said second temperature sensor, said chassis management module creates a personality card alert calling for repair.

7. The method as recited in claim 1 wherein providing the personality card comprising redundant critical components includes locating the personality card within an interior portion of the chassis computer system limiting access to the personality card.

8. A circuit for implementing an enhanced availability personality card for a chassis computer system; said circuit comprising:
   a pair of chassis management modules;
   the personality card comprising redundant critical components of a first erasable programmable read only memory (EPROM) and a second EPROM, each EPROM storing Vital Product Data (VPD) and a first temperature sensor and a second temperature sensor sensing temperature;
   a primary bidirectional bus and a redundant bidirectional bus respectively connected between said first EPROM and said first temperature sensor and said second EPROM and said second temperature sensor, and said pair of chassis management modules; and each said chassis management module including a switch connected to both said primary bidirectional bus and said redundant bidirectional bus providing redundant paths, and enabling continued function with failure of any critical personality card component.

9. The circuit as recited in claim 8 wherein said primary bidirectional bus and said redundant bidirectional bus comprising a respective independent 12C bus.

10. The circuit as recited in claim 8 wherein said primary bidirectional bus and said redundant bidirectional bus are coupled by a midplane of the chassis computer system to said respective switch of said pair of chassis management modules; and wherein the personality card is located with said midplane of the chassis computer system for limiting access to the personality card.

11. The circuit as recited in claim 8 wherein the personality card includes providing a first card including said first EPROM and said first temperature sensor and providing a second card including said second EPROM and said second temperature sensor.

12. The circuit as recited in claim 11 wherein the personality card including redundant critical components and redundant paths eliminates Single-Points-of-Failure (SPOF), ensuring very high availability of the personality card.

13. The circuit as recited in claim 8 includes said chassis management module creating a personality card alert calling for repair responsive to an access failure to the personality card of both critical redundant components, and continuing operation using data previously read from the personality card.

14. The circuit as recited in claim 8 further includes the personality card comprising a first general purpose I/O (GPIO) and a second GPIO respectively connected to said primary bidirectional bus and said redundant bidirectional bus, and wherein said chassis management module performs runtime operation to turn on a chassis LED via said first GPIO or said second GPIO.

15. The circuit as recited in claim 8 includes said chassis management module creating a personality card alert calling for repair responsive to a failure to successfully read data from both said first EPROM and said second EPROM, or responsive to a failure to read temperature from both said first temperature sensor and said second temperature sensor, and said management module continuing operation using data previously read from the personality card.

16. A design structure embodied in a non-transitory machine readable medium used in a design process, the design structure comprising:

a circuit tangibly embodied in the non-transitory machine readable medium used in the design process, said circuit for implementing an enhanced availability personality card for a chassis computer system, said circuit comprising:

a pair of chassis management modules;

the personality card comprising redundant critical components of a first erasable programmable read only memory (EPROM) and a second EPROM, each EPROM storing Vital Product Data (VPD) and a first temperature sensor and a second temperature sensor sensing temperature;

a primary bidirectional bus and a redundant bidirectional bus respectively connected between said first EPROM and said first temperature sensor and said second EPROM and said second temperature sensor, and said pair of chassis management modules; and each said chassis management module including a switch connected to both said primary bidirectional bus and said redundant bidirectional bus providing redundant paths, and enabling continued function with failure of any critical personality card component, wherein the design structure, when read and used in the manufacture of a semiconductor chip produces a chip comprising said circuit.

17. The design structure of claim 16, wherein the design structure comprises a netlist, which describes said circuit.

18. The design structure of claim 16, wherein the design structure resides on storage medium as a data format used for the exchange of layout data of integrated circuits.

19. The design structure of claim 16, wherein the design structure includes at least one of test data files, characterization data, verification data, or design specifications.

20. The design structure of claim 16, includes said chassis management module creating a personality card alert calling for repair responsive to an access failure to the personality card of both critical redundant components, and continuing operation using data previously read from the personality card.

* * * * *